US008243352B2

(12) United States Patent
Nakashio

(10) Patent No.: US 8,243,352 B2
(45) Date of Patent: Aug. 14, 2012

(54) IMAGE PROCESSING APPARATUS, IMAGE PROCESSING METHOD, AND PROGRAM

(75) Inventor: Hidekazu Nakashio, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 928 days.

(21) Appl. No.: 12/262,096

(22) Filed: Oct. 30, 2008

(65) Prior Publication Data

US 2009/0116046 A1 May 7, 2009

(30) Foreign Application Priority Data

Nov. 2, 2007 (JP) ................................. 2007-286068

(51) Int. Cl.
*G03F 3/08* (2006.01)
*H04N 1/60* (2006.01)
*G06K 9/36* (2006.01)
(52) U.S. Cl. ........................ 358/521; 358/1.9; 382/166
(58) Field of Classification Search .................. 358/521, 358/538, 539, 540; 382/166, 162, 167
See application file for complete search history.

(56) References Cited

U.S. PATENT DOCUMENTS

| 6,014,457 | A | 1/2000 | Kubo |
| 6,546,130 | B1 | 4/2003 | Inoue |
| 6,665,434 | B1* | 12/2003 | Yamaguchi ................... 382/162 |
| 6,701,007 | B1* | 3/2004 | Yamaguchi ................... 382/162 |
| 6,897,988 | B1* | 5/2005 | Saito et al. ..................... 358/515 |
| 7,965,426 | B2* | 6/2011 | Hori et al. ..................... 358/518 |
| 2001/0028471 | A1* | 10/2001 | Hirokazu ..................... 358/1.13 |
| 2003/0142377 | A1* | 7/2003 | Yamada et al. ............... 358/521 |
| 2004/0042807 | A1* | 3/2004 | Nakayama ...................... 399/49 |
| 2004/0105581 | A1* | 6/2004 | Sawada ........................ 382/162 |
| 2005/0206651 | A1 | 9/2005 | Sawada |
| 2005/0219602 | A1* | 10/2005 | Mikami ....................... 358/1.14 |
| 2007/0035754 | A1* | 2/2007 | Hori et al. ..................... 358/1.9 |
| 2007/0171245 | A1 | 7/2007 | Ueda |
| 2011/0080619 | A1* | 4/2011 | Aritomi et al. ............... 358/3.28 |

FOREIGN PATENT DOCUMENTS

| CN | 1674634 A | 9/2005 |
| EP | 1267565 A2 | 12/2002 |
| JP | 2006-173827 A | 6/2006 |

* cited by examiner

*Primary Examiner* — Madelein A Nguyen
(74) *Attorney, Agent, or Firm* — Canon USA, Inc., IP Division

(57) ABSTRACT

An image processing apparatus includes an image input unit configured to input image data, a calculation unit configured to calculate an application amount of a recording material to form an image on a recording paper according to the input image data, a conversion characteristics creation unit configured to create composite conversion characteristics based on gradation-prioritized conversion characteristics and tint-prioritized conversion characteristics according to the application amount, and a conversion unit configured to convert the image data according to the created conversion characteristics.

19 Claims, 12 Drawing Sheets

| R | G | B | C | M | Y | K |
|---|---|---|---|---|---|---|
| 0 | 0 | 0 | 0 | 0 | 0 | 255 |
| 0 | 0 | 255 | 127 | 127 | 0 | 0 |
| 0 | 255 | 0 | 127 | 0 | 127 | 0 |
| 255 | 0 | 0 | 0 | 127 | 127 | 0 |
| 0 | 255 | 255 | 255 | 0 | 0 | 0 |
| 255 | 0 | 255 | 0 | 255 | 0 | 0 |
| 255 | 255 | 0 | 0 | 0 | 255 | 0 |
| 255 | 255 | 255 | 0 | 0 | 0 | 0 |

| R | G | B | APPLICATION AMOUNT |
|---|---|---|---|
| 0 | 0 | 0 | 200 |
| 0 | 0 | 255 | 200 |
| 0 | 255 | 0 | 200 |
| 255 | 0 | 0 | 200 |
| 0 | 255 | 255 | 100 |
| 255 | 0 | 255 | 100 |
| 255 | 255 | 0 | 100 |
| 255 | 255 | 255 | 0 |

FIG.11
METHOD FOR ANALYZING APPLICATION AMOUNT DISTRIBUTION
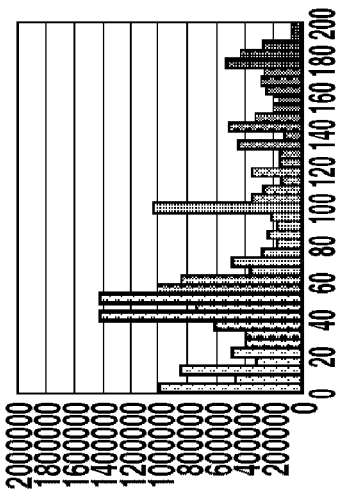
3-DIMENSIONAL LUT
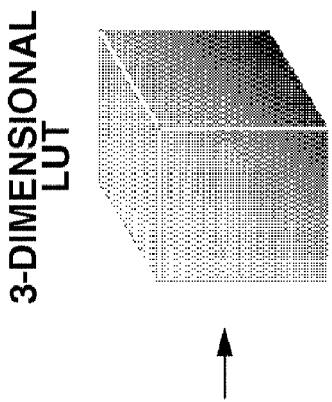
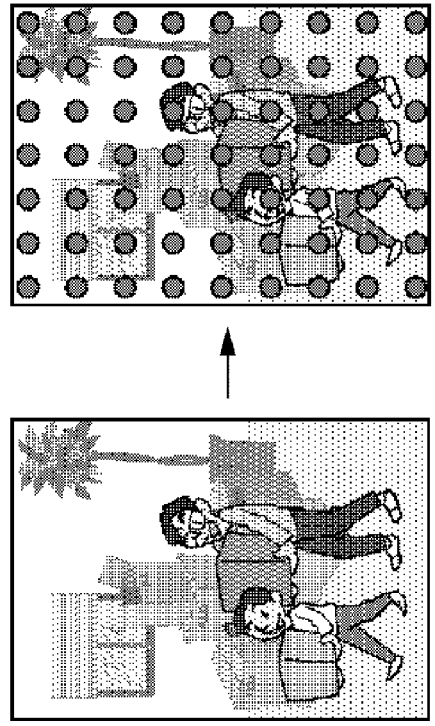
(1) OBTAIN RGB IMAGE SIGNAL FROM THINNED-OUT IMAGE DATA
(2) OBTAIN APPLICATION AMOUNT FROM RGB IMAGE SIGNAL REFERRING TO 3-DIMENSIONAL LUT
(3) CALCULATE APPLICATION AMOUNT DISTRIBUTION

IMAGE PROCESSING APPARATUS, IMAGE PROCESSING METHOD, AND PROGRAM

BACKGROUND OF THE INVENTION

1. Field of the Invention

The present invention relates to an image processing apparatus capable of converting image data according to an amount of applied toner, an image processing method, and a program.

2. Description of the Related Art

A recent electrophotographic image forming apparatus, such as a laser beam printer (LBP), is configured to perform not only monochrome printing but also color printing along with a technological advance of a controller in a host computer or a printer (serving as an image generation unit).

However, unlike a conventional monochrome printing apparatus, a color printing apparatus uses a plurality of color materials (e.g., cyan, magenta, yellow, and black toners) which are overlapped with each other to form a color image. To appropriately fix and transfer a plurality of color materials on a transfer sheet, an amount of color material applied on a transfer sheet (hereinafter, referred to as "application amount") is generally restricted to a constant value. The application amount is a value assuring a higher-quality image, because the application amount influences a color reproduction range (i.e., color gamut) available for a printed output, or the glossiness of a printed image.

The application amount places various restrictions on engine design. For example, print speed decreases due to increased fixing time, power consumption in fixing processing increases, and process design is changed depending on a type of a transfer sheet according to the application amount. Improving a degree of freedom in the engine design, performing printing on various types of recording media, reducing power consumption, and attaining a higher processing speed are desired. To satisfy these requirements, image forming apparatuses require a technique capable of producing a higher-quality image even when the amount of color material applied to a transfer sheet is reduced to a lower value (hereinafter, referred to as "low application amount").

Tint and gradation are key factors to assure the image quality realized by the low application amounts to be comparable to that attainable by ordinary application amounts. However, as described above, the color reproduction range realized by the low application amounts is narrow compared to that obtainable by the ordinary application amounts. Preserving ordinary levels of gradation and tint is difficult because the gradation tends to collapse when an ordinary level of tint is preserved and the tint tends to deteriorate when an ordinary level of gradation is preserved.

In general, a color space representing an input image (e.g., a monitor-dependent color space displayed by a monitor) is different from a color reproduction range of an image output apparatus. An image input apparatus generally has a wider color reproduction range. The image output apparatus cannot reproduce one or more colors included in the input image. Therefore, the image output apparatus compresses image data which is present outside of the color reproduction range so that all of the image data are present in the color reproduction range.

Conventionally, the following technique is available to compress the color space representing the input image into the color reproduction range of an image output device while realizing color reproduction appropriately. The technique includes analyzing a color gamut of input image data and converting the color space into a narrow color space capable of representing the color gamut of the input image, which is selectable from a plurality of color spaces prepared beforehand.

The technique further includes performing compressing image data into the color reproduction range of the image output device, using color gamut compression (color gamut mapping) parameters prepared beforehand in the converted color space. The technique can reduce a degree in the color gamut compression and can realize the color reproduction adequately, as discussed in Japanese Patent Application Laid-Open No. 2006-173827.

However, according to the above-described conventional technique, deviation in distribution of input pixels in the selected color space is not taken into consideration. Therefore, the conventional technique may select an excessively wide color space to perform the color gamut compression only for a small number of pixels that do not contribute to quality of an image. Furthermore, the conventional technique requires color gamut compression parameters prepared beforehand for respective color spaces.

Moreover, the color reproduction range of an image output device realized by low application amounts is narrow compared to that realized by ordinary application amounts. Therefore, if the application amount decreases to attain the ordinary tint, the gradation tends to collapse. If the application amount decreases to attain the ordinary gradation, the tint tends to deteriorate. Therefore, it is necessary to provide an appropriate method for compressing a color gamut to obtain a high-quality image.

SUMMARY OF THE INVENTION

The present invention is directed to conversion processing performed referring to composite conversion characteristics obtainable from gradation-prioritized conversion characteristics and tint-prioritized conversion characteristics based on an application amount of image data. As a result, the present invention can realize color reproduction with a low application amount comparable to the color reproduction realized with an ordinary application amount, while preventing image quality from deteriorating in both tint and gradation.

According to an aspect of the present invention, an image processing apparatus includes an image input unit configured to input image data, a calculation unit configured to calculate an application amount of a colored recording material to form an image on a recording medium according to the input image data, a conversion characteristics creation unit configured to create composite color conversion characteristics based on first conversion characteristics and second conversion characteristics according to the application amount, and a color conversion unit configured to color convert the image data according to the created conversion characteristics.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 11 illustrates example processing performed by an image thinning unit and an application amount calculation unit according to the second exemplary embodiment.

DETAILED DESCRIPTION OF THE EMBODIMENTS

Figure 1:
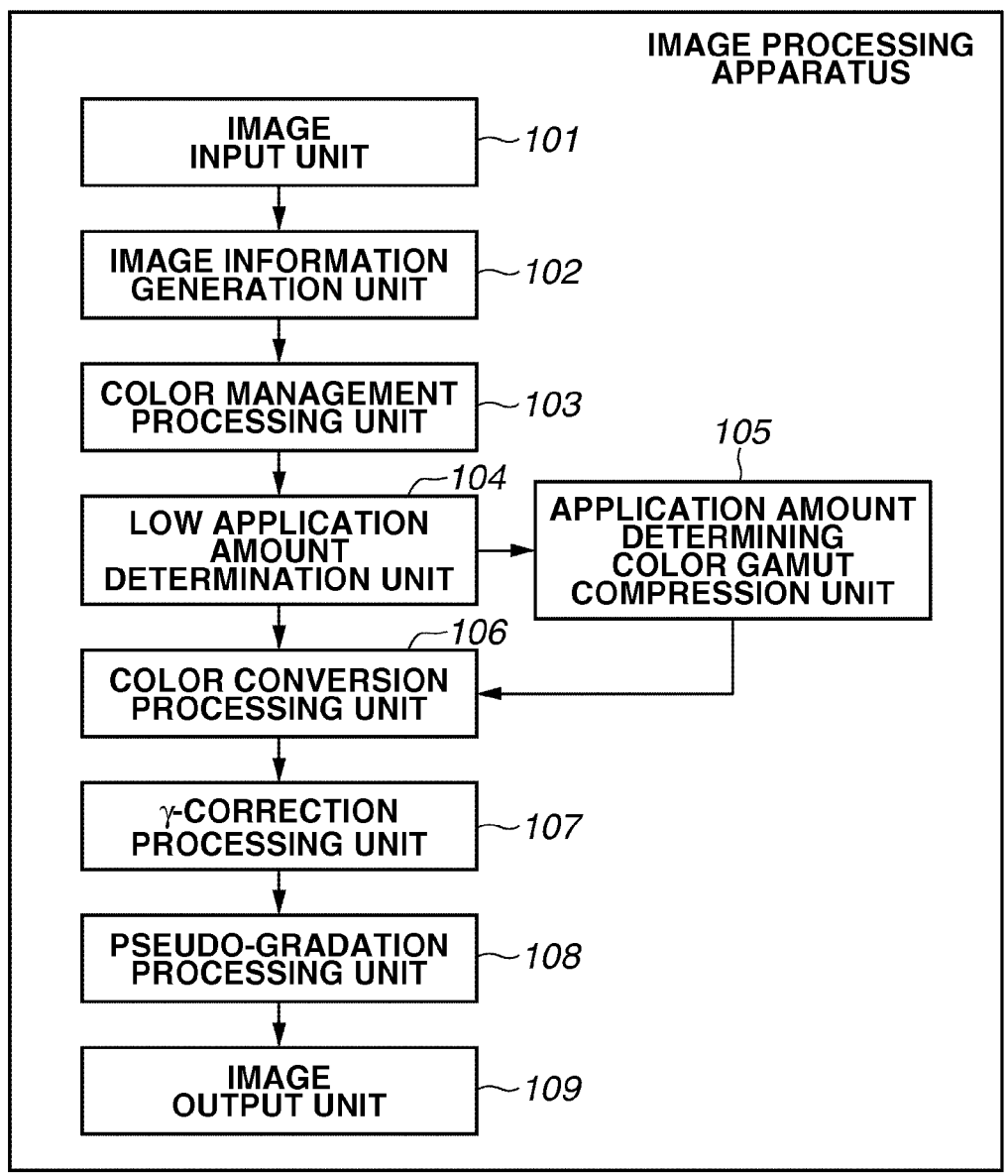
FIG. 1 illustrates an example of a configuration of an image processing apparatus according to an exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it need not be discussed for following figures. Exemplary embodiments will now be described in detail with reference to the drawings.

To simplify the description of exemplary embodiments of the present invention, "100% application amount" is defined as a representative low application amount and "200% application amount" is defined as a representative ordinary application amount.

First Exemplary Embodiment

FIG. 1 is a block diagram illustrating an image processing apparatus according to an exemplary embodiment of the present invention. An example image processing apparatus is, an electrophotographic color (or monochrome) image processing apparatus, such as a digital electrophotographic copying machine, a laser printer, or a facsimile machine, which can perform image formation processing with toners.

In FIG. 1, an image input unit 101 receives image data. For example, a personal computer (PC) includes a printer driver or comparable application software that can transmit the image data to the image processing apparatus according to an exemplary embodiment of the present invention illustrated in FIG. 1. A scanner unit is also usable to read an image and transmit read image data to the image processing apparatus. Page description language (PDL) is used to describe the image data obtained by the printer driver and an object constituting the PDL includes information indicating an attribute (e.g., graphics or text) of the object.

A text portion, a halftone portion, and a photo portion on an image obtained by a scanner can be identified by detecting edges from the image data of the image and checking the continuity of the detected edges.

An image information generation unit 102 processes the image data transmitted from the image input unit 101 and generates image information that enables discrimination of each object as a graphic, text, or the image data.

A color management processing unit 103 compresses a color gamut from a device-independent color space (for example, represented by the Lab or XYZ color space) into a device-dependent color reproduction range realized by ordinary color material application amounts. A color gamut compression method is changeable for each object according to the image information generated by the image information generation unit 102.

The following are representative color gamut compressions:

"tint-prioritized" compression for compressing a color gamut to equalize a tint of a compressed image (in the case where a processing target is an image displayed by a display device) with a color of the image displayed by the display device;

"color-difference minimized" compression for accurately outputting a designated color within a color reproduction range of a printer; and "vividness-prioritized" compression for compressing a color gamut of an image to preserve saturation capable of generating vivid colors.

A low application amount determination unit 104 determines whether to perform printing of an input image with low application amounts or ordinary application amounts of the color materials.

An application amount determining color gamut compression unit 105 adaptively creates a color conversion table for the image data by combining color conversion tables which are used to perform color gamut compression differentiated in characteristics based on an application amount distribution of the image data. An example color conversion processing method uses a three-dimensional look-up table (3-dimensional LUT), as a color conversion table.

Figure 2:
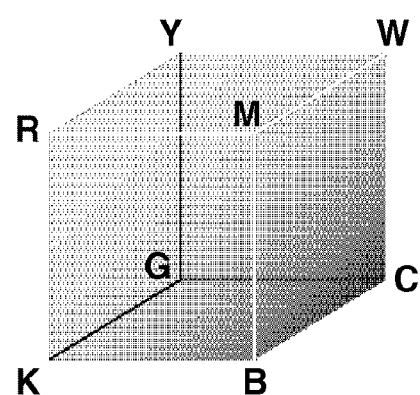
FIG. 2 illustrates an internal configuration of a color conversion table.

The 3-dimensional look-up table includes N×N×N grid points defining a correspondence relationship between RGB data and CMYK data in conversion. When an interval of the grid points is sufficiently narrow, the color conversion can be accurately performed in principle. However, under various restrictions (e.g., memory capacity, processing speed, etc.), it is rare that color conversion points accord with grid points. Therefore, the application amount determining color gamut compression unit 105 performs three-dimensional interpolation processing to obtain CMYK data (see FIG. 2). Detailed description of the three-dimensional interpolation processing is omitted since it is well known.

A color conversion processing unit 106 converts input image data into data suitable for a target image processing apparatus. For example, if the input image data is RGB data and the target image processing apparatus is a general color printer using CMYK toners, the color conversion processing unit 106 performs RGB-to-CMYK conversion processing, masking processing, and under color removal (UCR) processing.

A γ-correction processing unit 107 performs density characteristics correction processing on the data processed by the color conversion processing unit 106.

A pseudo-gradation processing unit 108 performs pseudo-gradation processing on density-corrected data. To execute the pseudo-gradation processing, the pseudo-gradation processing unit 108 can select an appropriate method, such as a density pattern method, a systematic dither method, or an error diffusion method, according to the type of an object. An image output unit 109 outputs image-processed data.

Figure 3:
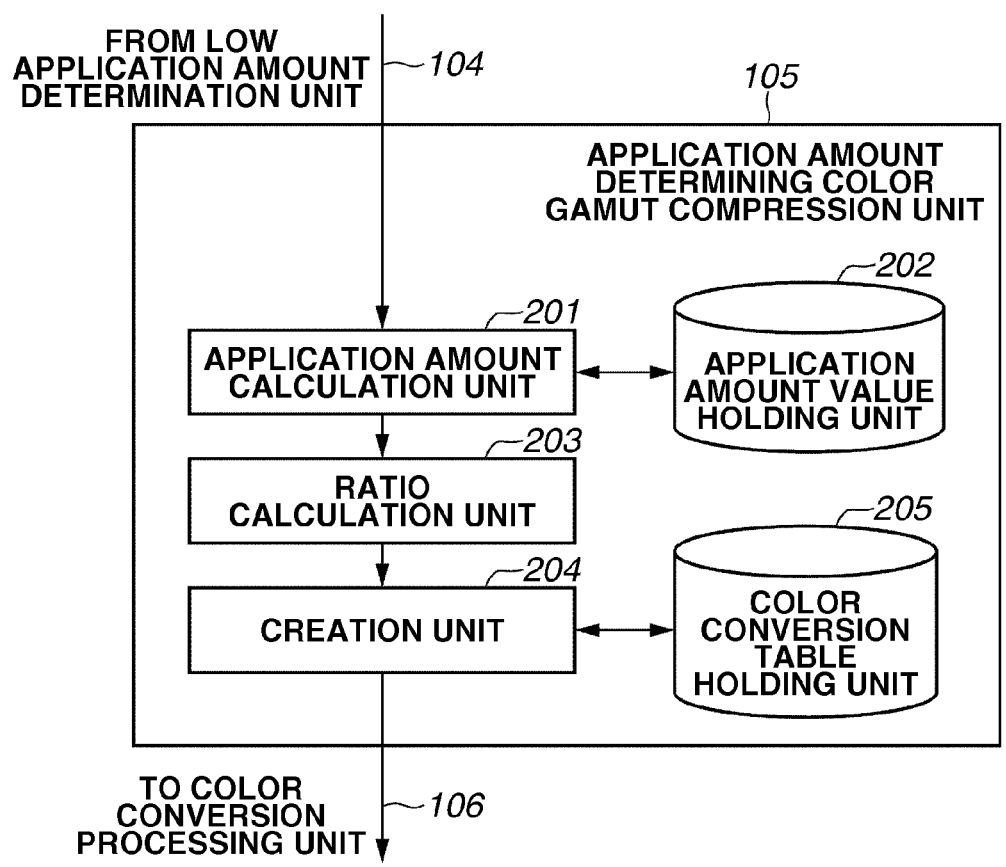
FIG. 3 illustrates an example arrangement of an application amount determining color gamut compression unit according to a first exemplary embodiment of the present invention.

FIG. 3 is a block diagram illustrating an example arrangement of the application amount determining color gamut compression unit 105 illustrated in FIG. 1 according to the first exemplary embodiment. The same reference numerals used in FIGS. 1 and 3 denote components having the same function.

In FIG. 3, an application amount calculation unit 201 calculates application amount values of all pixels, for each image data (for each object), and obtains an application amount distribution.

Figure 4:
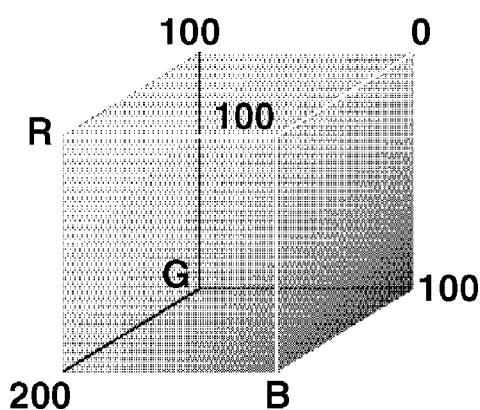
FIG. 4 illustrates an internal configuration of an application amount value holding unit.

An application amount value holding unit 202 stores application amount data corresponding to the data (e.g., RGB data) constituting an input image. An example method includes calculating application amounts required to reproduce each combination of RGB colors as illustrated in FIG. 4 in advance, and creating and storing a 3-dimensional LUT to output the application amounts corresponding to the input RGB data. The application amount value holding unit 202 stores the application amount data for a pixel corresponding to the maximum application amount set to 200%.

A ratio calculation unit 203 calculates a ratio of pixels exceeding a predetermined threshold relative to the total number of pixels for a given object (e.g. a graphics object, text object, or picture object) in the input image data of a page, based on the application amount distribution calculated by the application amount calculation unit 201.

A creation unit 204 creates a new color conversion table suitable for the image data based on the ratio calculated by the ratio calculation unit 203.

A color conversion table holding unit 205 holds a plurality of color conversion tables (conversion characteristics) differentiated in characteristics, based on which the creation unit 204 can create a new color conversion table.

Figure 5:
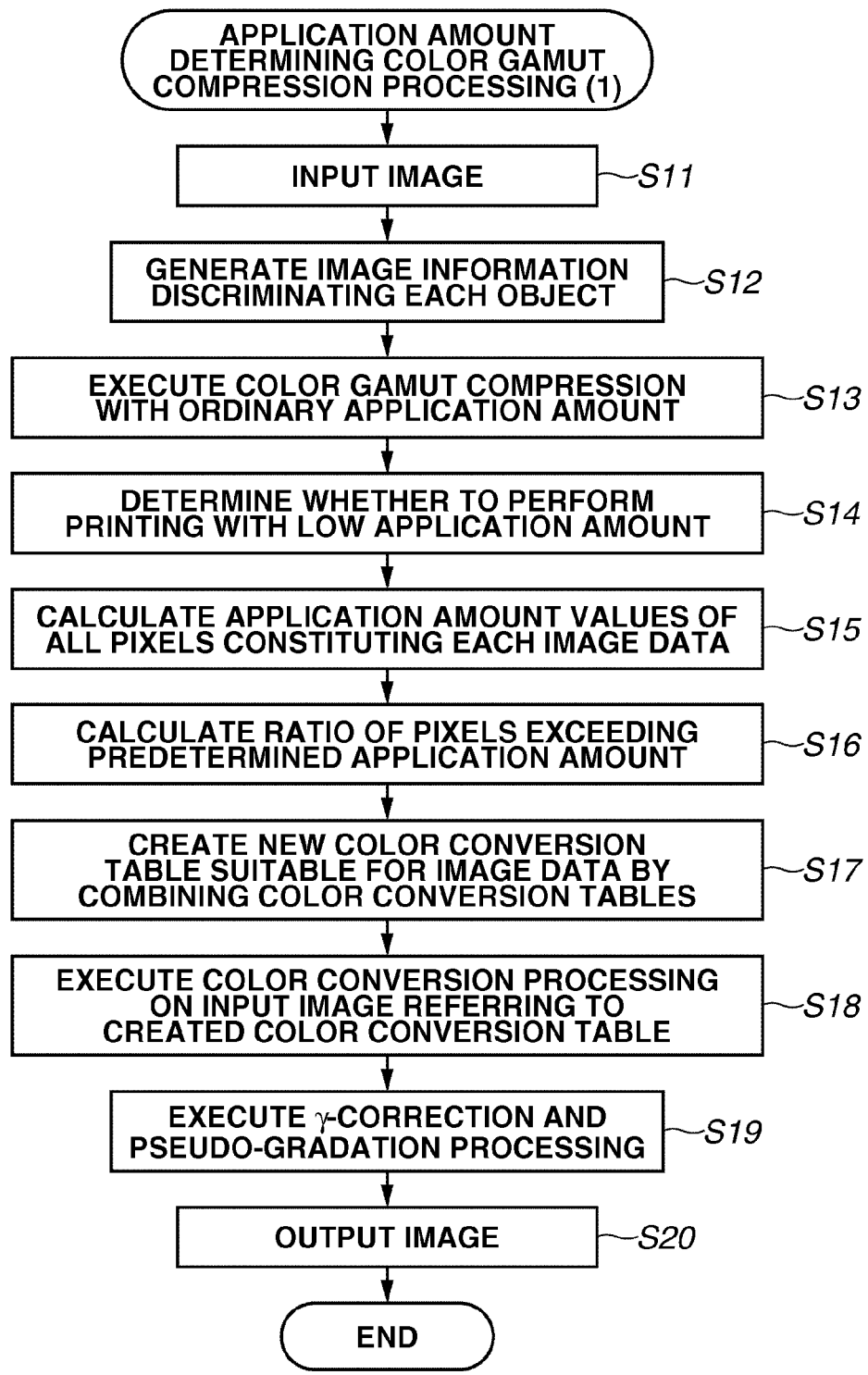
FIG. 5 is a flowchart illustrating example processing performed by an image processing apparatus according to the first exemplary embodiment.

FIG. 5 is a flowchart illustrating an example of processing performed by the image processing apparatus according to the first exemplary embodiment. In step S11, the image input unit 101 inputs image data. In step S12, the image information generation unit 102 processes data received from the image input unit 101 and generates image information about all image data which is discriminated per object (graphics, text, and image data) included in one page.

In step S13, the color management processing unit 103 compresses the color gamut from the device-independent color space into the device-dependent color reproduction range with the ordinary application amounts. In this case, the color management processing unit 103 can automatically select the color gamut compression method suitable for each object based on the image information generated by the image information generation unit 102. Alternatively, the color management processing unit 103 can change the color gamut compression method per object according to an instruction input by a user via an operation unit of the image processing apparatus or an operation unit (not illustrated) provided by a driver of a PC.

In step S14, the low application amount determination unit 104 determines whether to perform printing of the input image with low color material application amounts or the ordinary application amounts. In this case, a user can determine an output method beforehand.

In step S15, the application amount calculation unit 201 extracts RGB signals of each pixel from the image data for each object based on the image information generated by the color management processing unit 103. Next, the application amount calculation unit 201 calculates the application amount values for each pixel, with reference to application amount data stored in the application amount value holding unit 202. Then, the application amount calculation unit 201 obtains a sum of the application amount values of each pixel.

Figure 6:
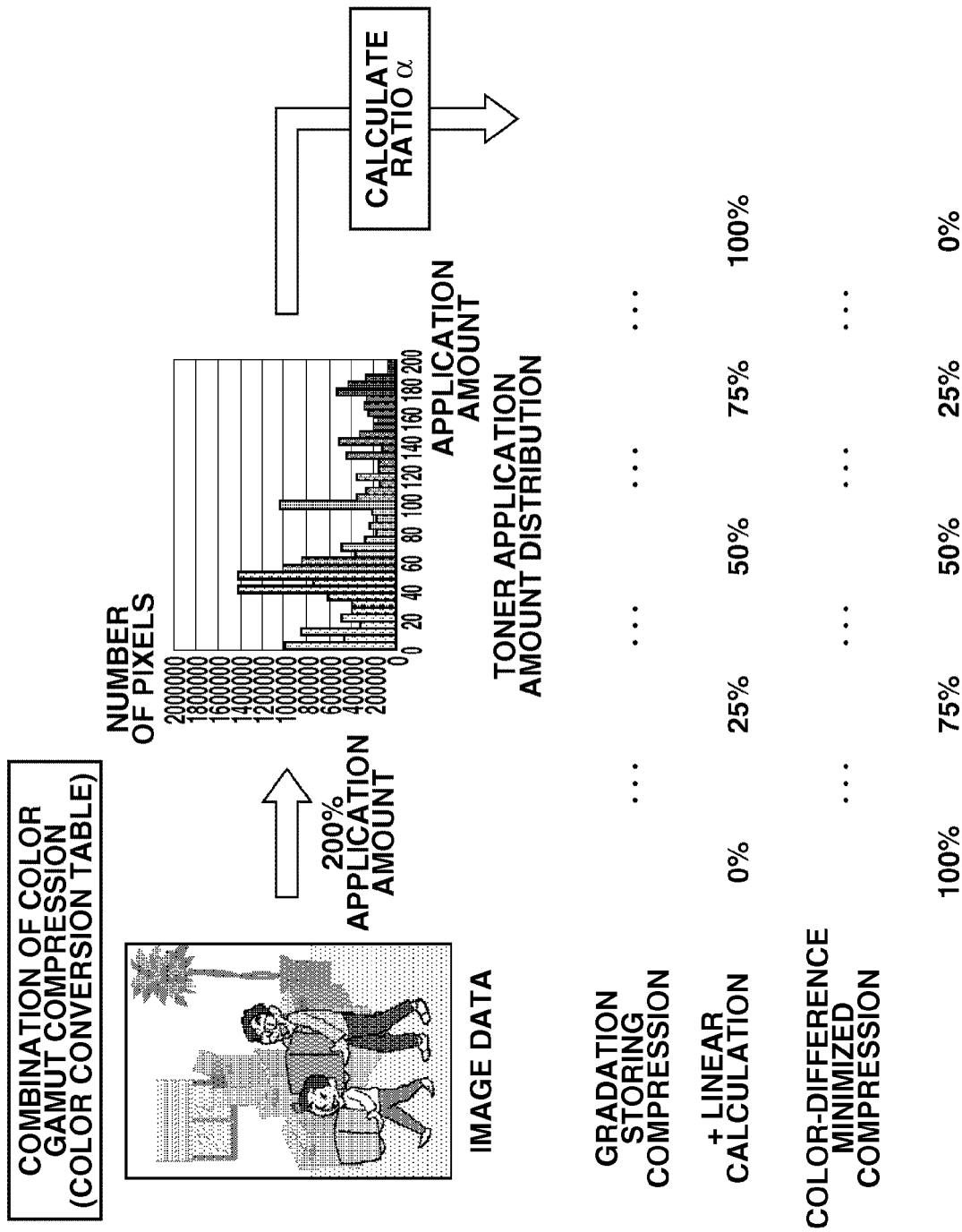
FIG. 6 illustrates example processing performed by an application calculation unit and a ratio calculation unit according to the first exemplary embodiment.

The application amount calculation unit 201 calculates an application amount of a recording material (e.g. toner) to form an image on a recording paper. The application amount calculation unit 201 repeats the above-described operations for all pixels constituting the image data, and calculates the application amount distribution of the image data for each object (see FIG. 6).

In step S16, the ratio calculation unit 203 calculates the ratio of pixels exceeding the 100% application amount (predetermined application amount) based on the application amount distribution calculated by the application amount calculation unit 201, according to the following formula.

ratio α=(number of pixels exceeding 100% application amount)/(number of all pixels constituting object image data)

The ratio α indicates a percentage of pixels, whose image quality at the 100% application amount deteriorates compared to the image quality at the 200% application amount, relative to all pixels. More specifically, when the ratio α is close to 0, the percentage of pixels exceeding the 100% application amount is small. Therefore, the tint and the gradation obtainable by the 100% application amount are comparable to those obtained by the 200% application amount.

However, when the ratio α is close to 1, it is difficult for many pixels to preserve the image quality by the 100% application amount at a level comparable to the image quality by the 200% application amount. Therefore, it is necessary to decrease the image quality to preserve the balance between tint and gradation (see FIG. 6).

However, instead of calculating the ratio α according to the above-described formula, a user can set a desired ratio α via an operation unit and determine arbitrarily a method for combining a plurality of color conversion tables in the next step S17. The present exemplary embodiment sets the representative low application amount as "100% application amount" and calculates the ratio of pixels exceeding the 100% application amount (a predetermined application amount value). Therefore, the predetermined application amount value needs to be changed according to the setting of the representative low application amount.

In step S17, the creation unit 204 combines a plurality of color conversion tables stored in the color conversion table holding unit 205 based on the ratio of pixels exceeding the 100% application amount calculated by the ratio calculation unit 203, and creates a composite color conversion table suitable for the input image data. In the present exemplary embodiment, the color conversion table holding unit 205 stores a plurality of color conversion tables that have been subjected to two types of color gamut compressions (gradation-prioritized and tint-prioritized), which are described below.

Figure 7:
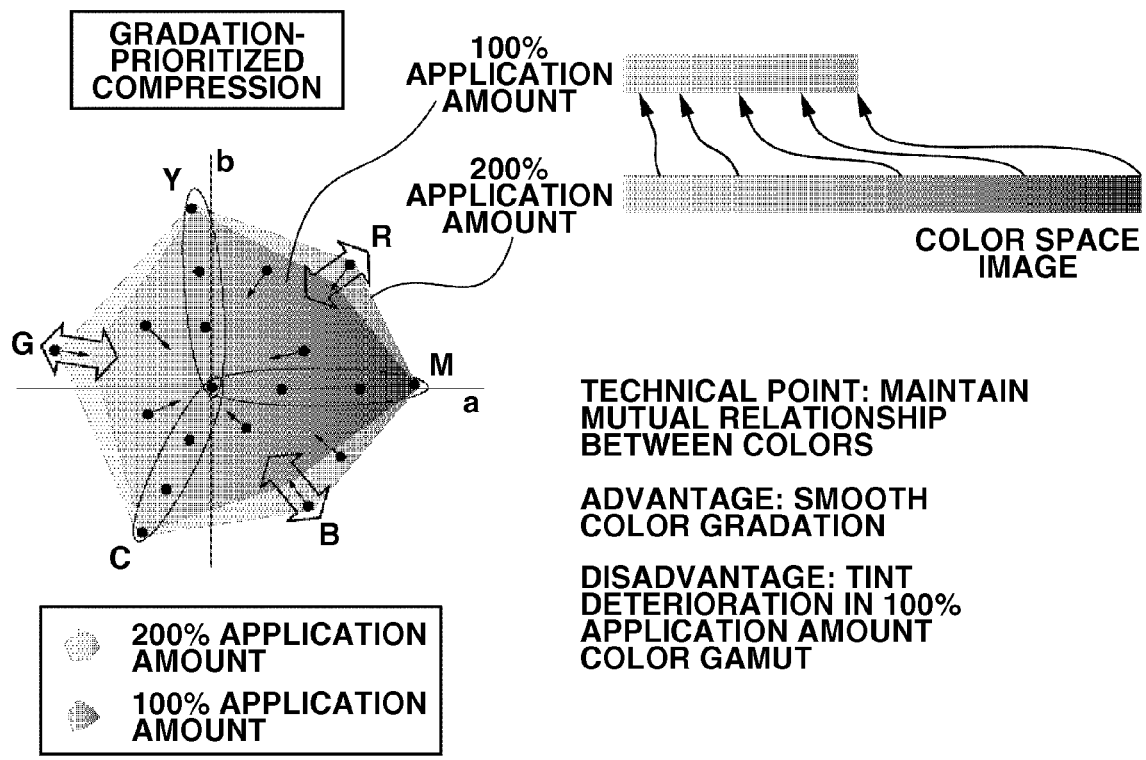
FIG. 7 illustrates an example of gradation-prioritized color gamut compression.

FIG. 7 illustrates an example of gradation-prioritized color gamut compression which preserves the gradation of each color while the color gamut compression from a 200% application amount color reproduction range into a 100% application amount color reproduction range is carried out. More specifically, primary colors of cyan, magenta, and yellow can secure the maximum color gamut obtained by the 100% application amount and, therefore, can preserve hue/saturation comparable to that obtained by the ordinary 200% application amount.

Secondary colors of red, green, and blue are reproducible from two of CMY color materials. Therefore, some pixels may exceed the 100% application amount. Hence, for the secondary colors, a 200% application amount color gamut is compressed to a 100% application amount color gamut while preserving a relative relationship between colors. Thus, the gradation of each color can be reproduced smoothly. However, due to the compression uniformly performed, vividness of each color deteriorates and the color becomes lighter even if the color is present in the 100% application amount color reproduction range.

Figure 8:
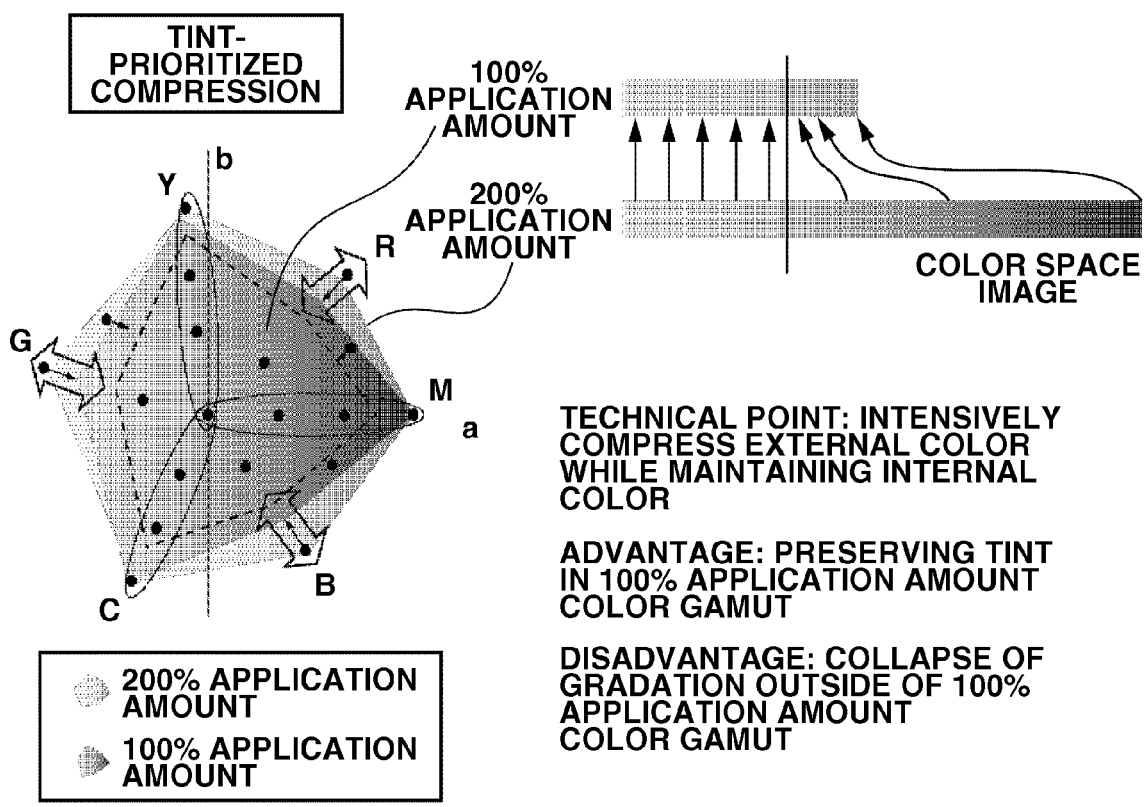
FIG. 8 illustrates an example of tint-prioritized color gamut compression.

FIG. 8 illustrates an example of tint-prioritized color gamut compression which preserves the tint of the 100% application amount color reproduction range while the color gamut compression from the 200% application amount color reproduction range into the 100% application amount color reproduction range is carried out. More specifically, similar to the gradation-prioritized color gamut compression, the primary colors of cyan, magenta, and yellow can secure the maximum color gamut obtained by the 100% application amount and, therefore, can preserve the hue/saturation comparable to that obtained by the ordinary 200% application amount.

The tint-prioritized color gamut compression for the secondary colors is performed by defining a color space existing in the 100% application amount color reproduction range, preserving the tint of each color existing in the color space, and intensively compressing colors existing outside of the color space (mapping on the surface of the color space according to the 100% application amount). Accordingly, the tint closer to the ordinary image quality can be reproduced for the colors existing in the color space. However, the gradations of the colors existing outside of the color space tend to collapse because these colors are subjected to intensive compression.

Figure 9:
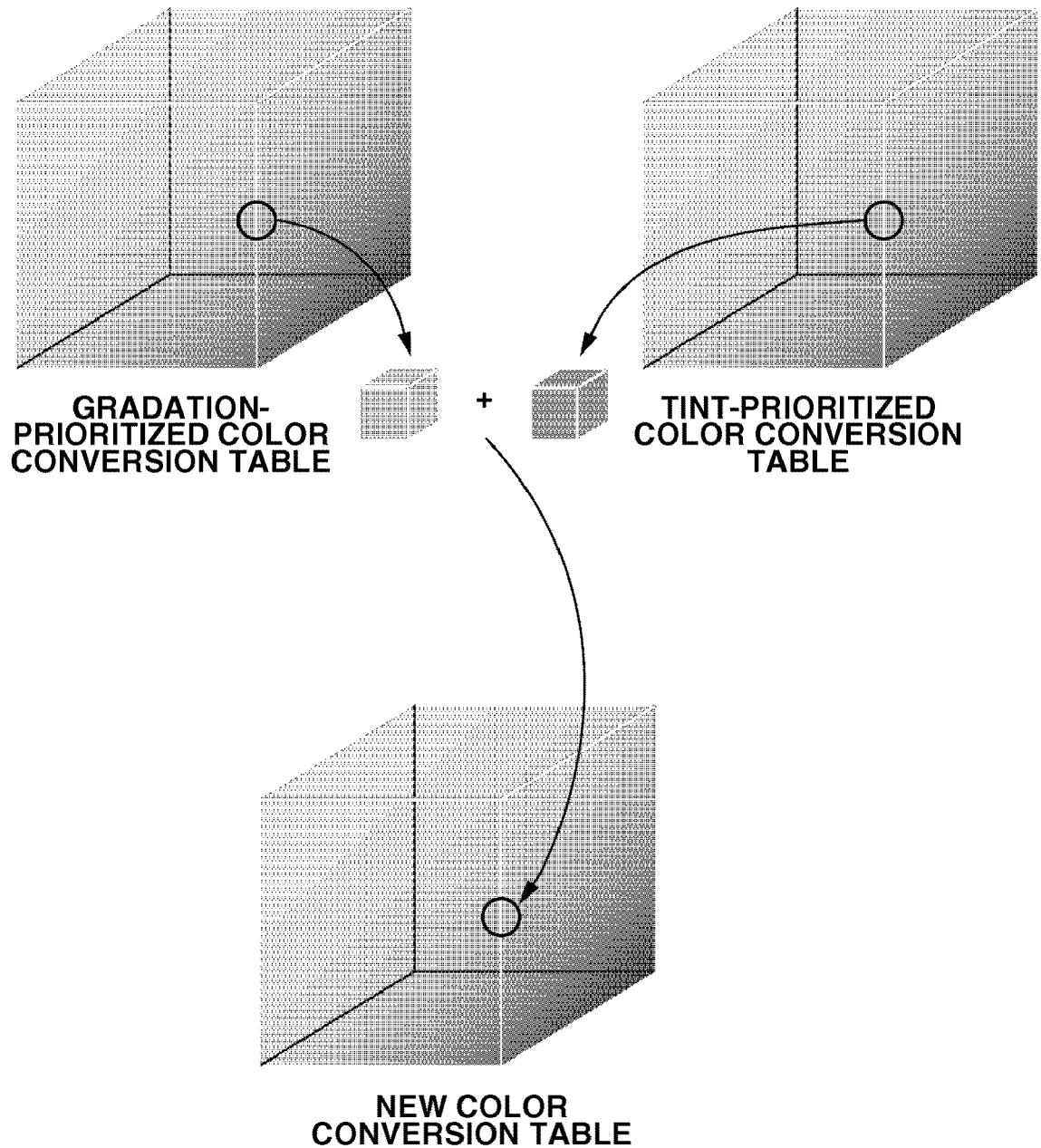
FIG. 9 illustrates an example of a method for combining color conversion tables.

The following is an example method for combining color conversion tables that have been subjected to the two different types (gradation-prioritized and tint-prioritized) of color gamut compressions based on the ratio of pixels exceeding the 100% application amount. As illustrated in FIG. 9, the method includes linear calculation (weighted summation) for obtaining CMYK data which is stored at grid points corresponding to the same input RGB values in respective color conversion tables according to the ratio of colors exceeding the 100% application amount which is calculated in step S16.

As a result, a composite color conversion table (i.e., a combined color conversion table) can be obtained. More specifically, the following is an example formula for weighted summation. The CMYK data to be stored at the grid points of a new color conversion table is calculated by the following formula and a new color conversion table suitable for input image data is created.

new color conversion table[$R,G,B$]=tint-prioritized [$R,G,B$]*(1−α)+gradation-prioritized[$R,G,B$]*α

Accordingly, the present exemplary embodiment can preserve features of the image data while limiting the application amount by combining different color gamut compressions based on an application amount distribution of the image data. The present exemplary embodiment can prevent the image quality from deteriorating in both tint and gradation.

In step S18, the color conversion processing unit 106 executes color conversion processing on input image referring to the color conversion table created in step S17.

In step S19, the γ-correction processing unit 107 and the pseudo-gradation processing unit 108 perform density correction and pseudo-gradation processing. In step S20, the image output unit 109 outputs the processed image data.

The above-described exemplary embodiment calculates the application amounts for each object and obtains the composite color conversion table according to an obtained ratio. However, the application amounts can also be calculated based on the object image data of the entire image to obtain the composite color conversion table according to the obtained ratio.

Second Exemplary Embodiment

An image processing apparatus according to a second exemplary embodiment of the present invention has an arrangement similar to that described in the first exemplary embodiment (see FIG. 1), the difference being that the application amount determining color gamut compression unit 105 includes an image thinning unit (301).

Figure 10:
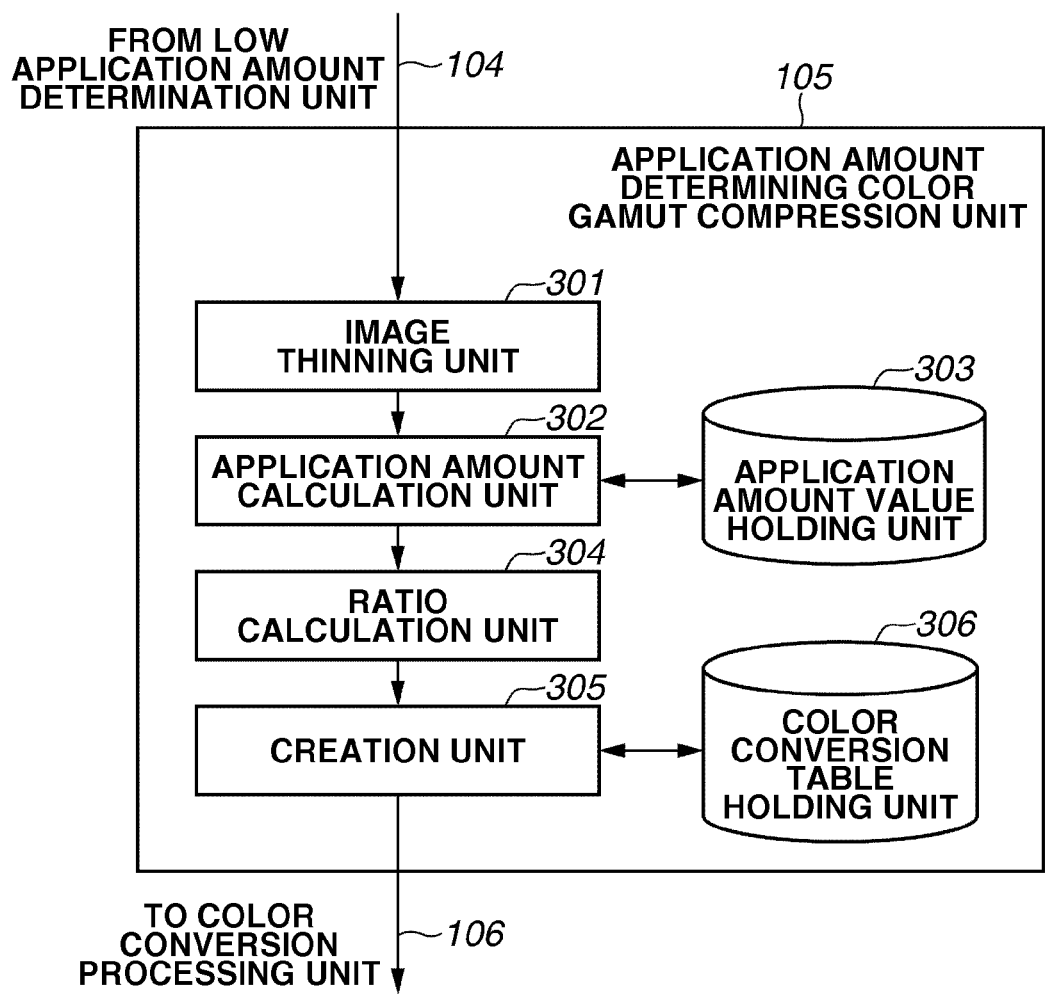
FIG. 10 illustrates an example arrangement of an application amount determining color gamut compression unit according to a second exemplary embodiment of the present invention.

FIG. 10 is a block diagram illustrating an example arrangement of the application amount determining color gamut compression unit 105 according to the second exemplary embodiment. The same reference numerals used in FIGS. 1 and 10 denote components having the same functions.

In FIG. 10, an image thinning unit 301 performs thinning processing on the whole or a part of the input image data at predetermined intervals, when the low application amount determination unit 104 determines to perform printing with low color material application amounts (see FIG. 11).

An application amount calculation unit 302 calculates application amount values for pixels which are thinned out by the image thinning unit 301, and obtains an application amount distribution.

An application amount calculation unit 302 calculates application amount values for pixels which are thinned out by the image thinning unit 301, and obtains an application amount distribution.

An application amount value holding unit 303 stores the application amount values for the data constituting an input image (e.g., RGB data).

A ratio calculation unit 304 calculates the ratio of pixels exceeding a predetermined threshold based on the application amount distribution calculated by the application amount calculation unit 302.

A creation unit 305 creates a new color conversion table suitable for the image data based on the ratio calculated by the ratio calculation unit 304.

A color conversion table holding unit 306 stores a plurality of color conversion tables differentiated in characteristics, based on which the creation unit 305 can create a new color conversion table. The above-described units 302 to 306 are similar to the units 201 to 205 described in the first exemplary embodiment.

Figure 12:
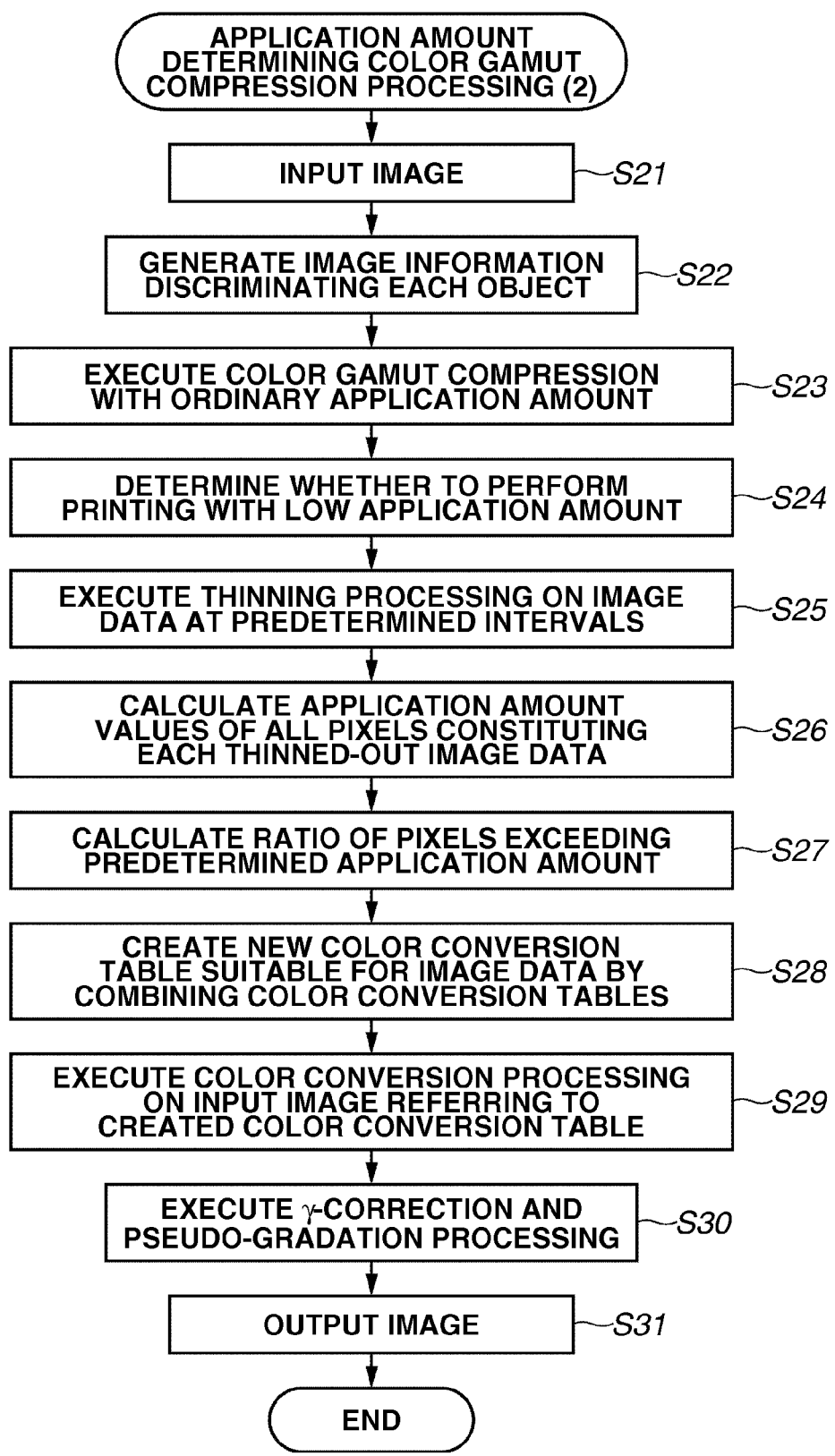
FIG. 12 is a flowchart illustrating example processing performed by an image processing apparatus according to the second exemplary embodiment.

FIG. 12 is a flowchart illustrating an example of processing performed by the image processing apparatus according to the second exemplary embodiment. The processing according to the second exemplary embodiment is similar to that described in the first exemplary embodiment (see FIG. 5), except that the image thinning unit 301 performs thinning processing on the image data of each object.

Processing in steps S21 to S24 are similar to the processing in steps S11 to S14 described in the first exemplary embodiment.

In step S25, the image thinning unit 301 performs the thinning on the image data of each object at the predetermined intervals based on the image information generated by the image information generation unit 102 i.e. the second exemplary embodiment does not calculate the application amount values of all pixels to obtain the application amount distribution. The second exemplary embodiment obtains the application amount distribution based on only the application amount values of a reduced number of pixels obtained by the thinning processing. Therefore, the second exemplary embodiment can increase the processing speed, although the accuracy may deteriorate because the application amount distribution does not reflect the application amount values of some pixels.

In step S26, the application amount calculation unit 302 extracts RGB signals of the pixels which are thinned out by the image thinning unit 301. Next, the application amount calculation unit 302 calculates the application amount values for each pixel referring to the application amount data stored in the application amount value holding unit 303 and obtains a sum of the application amount values of each pixel. The application amount calculation unit 302 repeats the above-described operations for all pixels obtained by the thinning processing and calculates the application amount distribution.

Processing in steps S27 to S31 is similar to the processing in steps S16 to S20 described in the first exemplary embodiment.

As described above, the present exemplary embodiment can prevent the image quality from deteriorating in both tint and gradation even in a case of the low application amount. Thus, the present exemplary embodiment can realize adequate color reproduction comparable to the image quality obtained by the ordinary application amount.

Other Exemplary Embodiment

Software program code for realizing functions of the above-described exemplary embodiments can be stored in a storage medium. A computer (or CPU or micro-processing unit (MPU)) can read the program stored in the storage medium and execute the program to operate devices to realize the functions of the above-described exemplary embodiments. Accordingly, the present invention encompasses a program code installable on a computer when the computer can realize the functions or processes of the exemplary embodiments.

Further, the exemplary embodiments of the present invention encompass the storage medium storing the program code and the program code itself. In this case, the storage medium supplying the program can be selected, for example, from any one of a floppy disk, a hard disk, an optical disk, a magneto-optical (MO) disk, a compact disk-read-only memory (CD-ROM), a CD-recordable (CD-R), a CD-rewritable (CD-RW), a magnetic tape, a nonvolatile memory card, a ROM, and a DVD (DVD-ROM, DVD-R).

Moreover, the exemplary embodiments of the present invention encompasses not only the program code which is stored in any one of the above mentioned storage medium and solely executes processing of the exemplary embodiments but also a program code which is running on an operating system (OS) to execute processing of the exemplary embodiments together with other application software, and a function expansion board equipped in a computer or into a memory of a function expansion unit connected to the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-286068 filed Nov. 2, 2007, which is hereby incorporated by reference herein in its entirety.

What is claimed is:

1. An image processing apparatus comprising:
   an image input unit configured to input image data;
   a calculation unit configured to calculate an application amount of a colored recording material to form an image on a recording medium according to the input image data;
   a weight calculation unit configured to calculate, based on the application amount of the colored recording material calculated by the calculation unit, a weight used for compositing conversion characteristics for performing a gradation-prioritized color gamut compression and conversion characteristics for performing a tint-prioritized color gamut compression;
   a conversion characteristics creation unit configured to create composite color conversion characteristics based on the conversion characteristics for performing the gradation-prioritized color gamut compression and the conversion characteristics for performing the tint-prioritized color gamut compression according to the calculated weight.

2. The image processing apparatus as claimed in claim 1, wherein the weight calculation unit calculates a ratio of pixels having an application amount equal to or greater than a predetermined value relative to all pixels constituting the image data to obtain the weight.

3. The image processing apparatus according to claim 2, wherein the greater the ratio is, the more the conversion characteristics for performing the gradation-prioritized color gamut compression is weighted relative to the conversion characteristics for performing the tint-prioritized color gamut compression when compositing the color conversion characteristics.

4. The image processing apparatus according to claim 1, wherein the image data relates to a plurality of objects and each object is classifiable into one of a plurality of object types, the calculation unit being configured to calculate a ratio of pixels having an application amount equal to or greater than a predetermined value relative to all pixels constituting each object, the conversion characteristics creation unit being operable to create the composite color conversion characteristics according to the calculated ratio.

5. The image processing apparatus according to claim 4, wherein if the ratio of the pixels having the application amount equal to or greater than the predetermined value relative to all pixels constituting each object is increased, the conversion characteristics creation unit creates the composite color conversion characteristics by increasing a weighting factor for the gradation-prioritized conversion characteristics compared to a weighting factor for the tint-prioritized conversion characteristics.

6. The image processing apparatus according to claim 1, wherein the conversion characteristics creation unit is operable to create the composite color conversion characteristics in response to an instruction for performing image formation processing with an application amount lower than that in an ordinary image formation process.

7. The image processing apparatus according to claim 1, wherein a color conversion table including grid points constitutes the first and second conversion characteristics, and the conversion characteristics creation unit is configured to obtain the composite color conversion characteristics by adding values stored at grid points of a gradation-prioritized color conversion table and values stored in a tint-prioritized color conversion table which are weighted according to the application amount.

8. The image processing apparatus according to claim 1, wherein the calculation unit is configured to calculate the application amount after thinning the image data input by the image input unit.

9. The image processing apparatus according to claim 1, further comprising a conversion unit configured to convert the image data based on the created composite color conversion characteristics.

10. A color conversion method comprising:
   inputting image data;
   calculating an application amount of a colored recording material to form an image on a recording medium according to the input image data;
   calculating, based on the calculated application amount of the colored recording material, a weight used for compositing conversion characteristics for performing a gradation-prioritized color gamut compression and conversion characteristics for performing a tint-prioritized color gamut compression;
   creating composite color conversion characteristics based on the conversion characteristics for performing the gradation-prioritized color gamut compression and the conversion characteristics for performing the tint-prioritized color gamut compression according to the calculated weight.

11. The color conversion method as claimed in claim 10, wherein calculating the weight includes calculating a ratio of pixels having an application amount equal to or greater than a predetermined value relative to all pixels constituting the image data to obtain the weight.

12. The color conversion method according to claim 11, wherein the greater the ratio is, the more the conversion characteristics for performing the gradation-prioritized color gamut compression is weighted relative to the conversion characteristics for performing the tint-prioritized color gamut compression when compositing the color conversion characteristics.

13. The color conversion method according to claim 10, wherein the image data relates to a plurality of objects and is discriminable for each object, and the method further comprises:
   calculating a ratio of pixels having an application amount equal to or greater than a predetermined value relative to all pixels constituting each object, and
   creating the composite color conversion characteristics according to the calculated ratio.

14. The color conversion method according to claim 10, wherein if the ratio of the pixels having the application amount equal to or greater than the predetermined value relative to all pixels constituting each object is increased, the method further comprising creating the composite color conversion characteristics by increasing a weighting factor for the gradation-prioritized conversion characteristics compared to a weighting factor for the tint-prioritized conversion characteristics.

15. The color conversion method according to claim 10, further comprising creating the composite color conversion characteristics in response to an instruction for performing image formation processing with an application amount lower than that in an ordinary image formation processing.

16. The color conversion method according to claim 10, wherein a color conversion table including grid points constitutes the first and second conversion characteristics, and the method further comprising obtaining the composite color conversion characteristics by adding values stored at grid points of a gradation-prioritized color conversion table and values stored in a tint-prioritized color conversion table which are weighted according to the application amount.

17. The color conversion method according to claim 10, further comprising thinning the input image data and calculating the application amount.

18. The color conversion method according to claim 10, further comprising converting the image data based on the created composite color conversion characteristics.

19. A non-transitory computer readable storage medium that carries a computer program which when loaded into a computer and executed causes the computer to perform a color conversion method comprising:
   inputting image data;
   calculating an application amount of a colored recording material to form an image on a recording medium according to the input image data;
   calculating, based on the calculated application amount of the colored recording material, a weight used for compositing conversion characteristics for performing a gradation-prioritized color gamut compression and conversion characteristics for performing a tint-prioritized color gamut compression;
   creating composite color conversion characteristics based on the conversion characteristics for performing the gradation-prioritized color gamut compression and the conversion characteristics for performing the tint-prioritized color gamut compression according to the calculated weight.

* * * * *